United States Patent Office 2,960,196
Patented Nov. 15, 1960

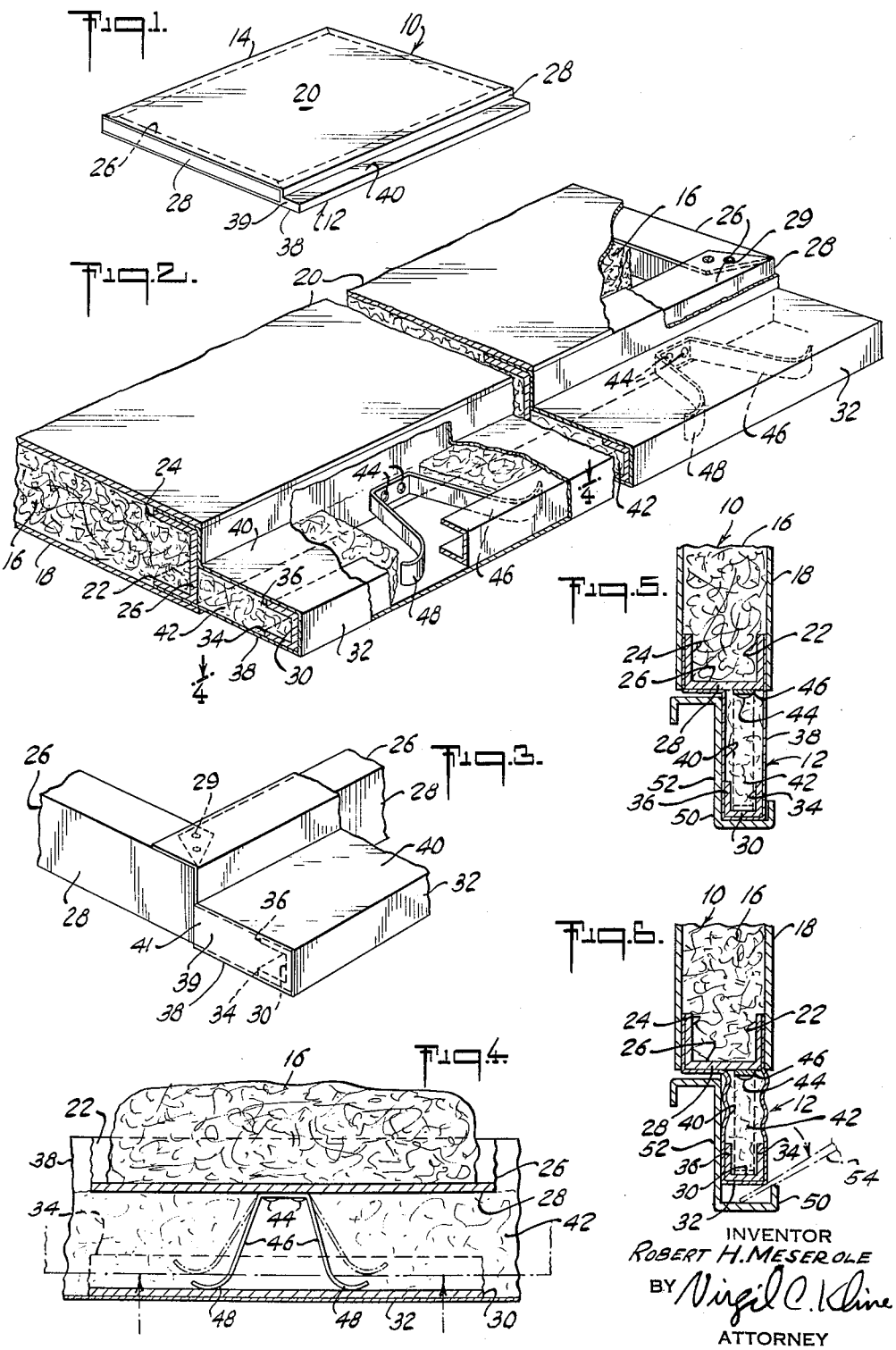

2,960,196
RESILIENT INSULATED EDGE CONSTRUCTION FOR THERMAL INSULATING BLANKETS

Robert H. Meserole, Middlesex, N.J., assignor to Johns-Manville Corporation, New York, N.Y., a corporation of New York Filed Oct. 11, 1956, Ser. No. 615,387
1 Claim. (Cl. 189—34)

This invention relates to a thermal insulating blanket construction, and more particularly, to a resilient insulating edge construction of a sheet metal enclosed fibrous thermal insulating blanket of an otherwise relatively rigid structural type, said edge construction being adapted for yieldingly resisting primarily edgewise applied external distortion forces to prevent deformation of the main blanket.

Thermal insulating blankets having sheet metal enclosures are being employed for insulating high temperature surfaces, such as presented in jet engine nacelles and the like, wherein it is desirable to insulate such surfaces from the rest of the aircraft structure. Such insulation blankets of sheet metal construction are usually mounted on the structural members of an aircraft, on which an edge or edges of the insulating blanket are arranged to fit snugly in areas bounded by the structural members, especially in angular bends of the structural members, for forming an effective seal, thereby preventing circulation of heated air or gases around the blanket so as to come into contact with the rest of the aircraft structure which is intended to be insulated. However, during mounting of such a relatively rigid thermal insulation blanket, the edge of the blanket may be distorted by external forces applied thereon for insertion of the edge in the area bounded by the structural members. It is of utmost importance that the blanket edges do not become permanently distorted by buckling, wrinkling, or the like, for the hot gases and heated air which come in contact with the surface of the blanket may find outlets on the buckled blanket edge sides and circulate around the blanket thereby defeating the purpose of such insulation.

It is therefore the purpose of the present invention to provide a thermal insulating blanket with a flexible or resilient edge which is adapted to yieldingly resist primarily edgewise applied external distortion forces and to return to its original shape and size after the external forces are removed thereby making a sealing contact with the sides of the angular bends or other portions of the structure on which the blanket is mounted.

It is further the purpose of the present invention to provide a new and improved resilient insulating blanket edge of the type described, which may be compressed or flexed at least in one direction, toward the main body of the insulating blanket, without losing its flexibility, and which is of simple and inexpensive construction.

In general, a sheet metal enclosed thermal insulating blanket constructed with a resilient insulating edge in accordance with the present invention, comprises a sheet metal sheathed edge, or box edge, completely enveloping an insulating fibrous core, and having relatively flexible sheet metal faces or surfaces supported by an end wall of substantial rigidity. Spring means disposed in the box edge and along the length of the end wall yieldingly urge the end wall outwardly so as to maintain the relatively flexible faces distended.

These and other features of the present invention are described in detail below in connection with the accompanying drawing, in which like numerals designate like parts, and in which:

Fig. 1 is a view in perspective of a thermal insulating blanket of relatively rigid structure formed with a flexible insulating edge embodying the present invention;

Fig. 2 is a fragmentary view in perspective, with portions broken away for purposes of illustration, of the flexible insulating edge of the thermal insulating blanket of Fig. 1;

Fig. 3 is a fragmentary view, in perspective, of the sheet metal enclosure construction of the flexible insulating edge of the thermal insulating blanket of Fig. 1;

Fig. 4 is a fragmentary section taken substantially along the line 4—4 in Fig. 2;

Fig. 5 is a cross section of the thermal insulating blanket structure of Fig. 1 shown as being mounted on a supporting structural member; and Fig. 6 is a view similar to that of Fig. 5 illustrating the buckling or wrinkling of the face sheets of the resilient insulating edge during installation of the thermal insulating blanket on the supporting structural member.

Referring now in detail to the drawing, a metal sheathed insulating blanket is indicated generally by the reference numeral 10, and as shown, is constructed in accordance with the present invention with a relatively resilient or flexible sheet metal enclosed insulating edge as indicated generally by the reference numeral 12. The blanket 10 comprises a moisture excluding and shape sustaining sheet metal jacket or sheath 14 of relative rigidity, completely enveloping an insulation core or filling 16. The core 16 may comprise felted mineral fibers, such as asbestos or mineral wool, lightly bonded with a heat resistant binder, or a special refractory fiber felt, for particularly high temperature service.

The metal sheath 14 of the insulating blanket 10 is made up of two face sheets 18 and 20 of high temperature alloy, such as Inconel, which face sheets 18 and 20 are secured, in any suitable manner, as by welding, at their edge portions, respectively, to the parallel legs 22, 24 of channel-shaped members 26 forming a substantially rigid frame, as shown in Figs. 1–3. The channel-shaped members 26 formed into a frame of substantial rigidity constitute the upstanding side or edge walls of the sheath 14 as indicated at 28. The frame may be formed of a channel-shaped strip of high temperature alloy sheet stock, such as Inconel, which strip is cut at four or more places on the parallel legs thereof, depending on the desired number of sides to be formed thereby, and is connected at the cut edges, as by electric welding, to form overlapping joints 29 at the corners of the frame. The frame thus formed by the channel-shaped members 26, and the rigidifying effect of the face sheets, usually of relatively heavy gauge, provide for sufficient rigidity in the blanket sheath 14, to prevent its endwise or edgewise compression, thereby forming as the main blanket section a relatively rigid or sturdy structure. However, additional reinforcing external or internal structure, such as ribs or cross members, may be employed if additional rigidity is required. As indicated above, the space formed between the parallel disposed face sheets 18 and 20 and the side walls 28 is completely filled or packed by the insulating blanket core 16.

The resilient insulating edge portion 12 of the metal sheathed thermal insulating blanket 10 may be formed of a channel-shaped member 30 of the same or similar material, size, and shape as member 26. As illustrated, member 30 is formed to a smaller cross-sectional size than the channel-shaped member 26, as it is sometimes desired to form a stepped edge portion. Member 30 is disposed in spaced relation to the channel-shaped member 26 or end wall 28, as shown in Fig. 1, and, likewise, imparts rigidity to an upstanding end wall 32 formed by a sheet metal strip bent around the channel-shaped member 30 and secured thereto as by welding. The sheet metal strip forming the end wall 32 may further be bent so as to extend parallel to the legs 34 and 36 of the channel-shaped member 30 thereby forming relatively flexible metal face sheets 38 and 40 of the edge section 12. The lower sheet metal face sheet 38 may desirably extend between the lower blanket face sheet 18 and the lower leg 22 of the channel-shaped member 26 to which it is fixedly secured. The upper sheet metal face or surface 40 of the edge section 12 may extend to the outer side of the channel-shaped member 26 and be bent upwardly and then horizontally so as to form the outer face of a portion of the blanket upstanding end wall 28 and to extend between the upper face sheet 20 and the upper leg 24 of the channel-shaped member 26, to which it is fixedly attached in any suitable well-known manner, as by welding. The end edge walls 39 of the edge section 12 may be formed of portions 41 of either of the face sheets 38 and 40, which portions 41 are bent upwardly or downwardly, as the case may be, so as to abut against the end edges of the channel member 30, and the end edges of the sheet metal of the end wall 32, to which they are fixedly secured as by welding. The portions 41 are also fixedly secured to the channel member 26 of the blanket wall 28, and to the other of either face sheet 38 or 40, so as to form therewith a sealed enclosure. The walls 39 may obviously be formed of sheet metal in any other suitable manner as long as the flexibility or resiliency of the sheet metal thereof is not impaired. The sheet metal enclosure of the edge section 12 is, however, usually prefabricated in the desired shape and then assembled with the rest of the structural members of the metal sheath 14 of the thermal insulating blanket 10. Although the edge section 12 of the blanket 10 may be formed as a stepped extension of the sheet metal sheath 14, as shown in Fig. 1, it may also be formed as a continuous extension of the same cross sectional size as the metal sheath 14.

The end edge wall 39, the face sheets 38 and 40, and the edge wall 32 of the blanket edge section 12 are arranged to have sufficient yieldability, to flex, buckle, or wrinkle enough to permit compression of the box shaped edge portion 12 toward edge wall 28. The sheet metal employed for the enclosure of the edge portion 12 is thus softer or less brittle and of lighter gauge than the sheet metal employed for the main body of the blanket sheath 14, so as to prevent its cracking due to distortion. For example, the sheet metal (foil) employed for the face sheets of the edge portion 12 may be "dead soft" and have a thickness of 0.001 inch, while the sheet metal employed for the face sheets of sheath 14 may be relatively stiff, hard, and brittle, having a thickness of, say, 0.003 inch. The inner space of the box shaped edge section 12 formed by the face sheets 38 and 40, portions 41, and the end wall 32 is completely filled with an insulating fibrous core 42, as in the blanket 10.

Attached to the lower portion of the outer face of the web of the channel-shaped member 26, on the side wall 28 from which the resilient edge portion 12 extends, as by welding or riveting, as indicated at 44, are U- or V-shaped spring elements 46, only two of which are shown, as in Fig. 2, disposed along the length of the channel-shaped member 26 and extending laterally inside the box edge section 12. Each spring element 46 is further formed with curved ends 48 arranged to slidably abut the inner surface of the web of the channel-shaped member 30, and therefore of the end wall 32, thereby urging the end walls 28 and 32 into a spaced relation in which the relatively flexible sheet metal faces 38 and 40, and the portions 41, of the edge section 12 are maintained substantially completely distended.

By this arrangement, the upstanding end wall 32 may be compressed or moved endwise or inwardly as a unit toward the blanket end wall 28, thereby temporarily flexing or buckling the edge section face sheets 38 and 40, and the portions 41 thereof, while being inserted with the assistance of a tool, as indicated at 54, between the angular bends 50 of a supporting structural member 52, as shown in Figs. 5 and 6, or in any space presenting similar problems in obtaining a snug fit of the blanket edges, for optimum sealing effectiveness. The spring elements 46, however, will yieldingly resist such compression or distortion of the box edge 12 and will return the end wall 32 and, therefore, the face sheets 38 and 40 and the portions 41, to their original shape as soon as the external forces applied thereto by the tool 54 during mounting of the blanket 10 are removed. The resilient means 46 alternatively could be turned around and fixed to the web of channel 30, with curved ends 48 bearing against wall 28, or any other suitable resilient means could be employed.

The present invention has been described in detail above for purposes of illustration only and is not intended to be limited by this description or otherwise except as defined in the appended claim.

What I claim is:

The combination of a thermal insulating blanket and a supporting member having angular bends which retain said thermal insulating blanket in a desired position, said thermal insulating blanket comprising a frame formed by a plurality of relatively undistortable side walls, a pair of opposed face sheets of relatively rigid material attached to said frame, a core of insulating material enclosed by said frame and said opposed face sheets, at least one resilient edge construction for said thermal insulating blanket, said resilient edge construction extending generally perpendicularly to one of said side walls of said frame and substantially in a plane generally parallel to the general plane defined by at least one of said opposed face sheets, said resilient edge construction comprising, at least one relatively undistortable side wall extending generally parallel to said one of said side walls of said frame, a pair of opposed relatively flexible face sheets each attached to said one side wall of said frame and said one side wall of said resilient edge construction, a core of insulating material enclosed by structure comprising said one side wall of said frame, said one side wall of said resilient edge construction and said relatively flexible face sheets, and means in said resilient edge construction for urging said one side wall of said resilient edge construction away from said one side wall of said frame, said supporting member securely holding said thermal insulating blanket in position, said supporting member having at least one portion thereof having a recess formed therein by said angular bends, said recess receiving said resilient edge construction, said means in said resilient edge construction also retaining said resilient edge construction distended to cooperate with said one portion of said supporting member to retain said resilient edge construction within said supporting member, said means also retaining said resilient edge construction distended in a plane generally parallel to said general plane defined by said one of said opposed face sheets when subjected to relatively high compression forces acting in a generally perpendicular direction to said general plane of said one of said opposed face sheets but whereby said resilient edge construction yieldingly but resiliently resists distortion forces applied thereto during mounting in said recess formed in said supporting member.

References Cited in the file of this patent

UNITED STATES PATENTS

| 1,554,395 | Young | Sept. 22, 1925 |
| 2,021,786 | Hurxthal | Nov. 19, 1935 |
| 2,519,160 | Tucker | Aug. 15, 1950 |
| 2,545,902 | Sugar | Mar. 20, 1951 |

FOREIGN PATENTS

| 220,759 | Great Britain | Aug. 28, 1924 |
| 276,684 | Great Britain | Mar. 8, 1928 |
| 1,017,144 | France | Sept. 10, 1952 |